United States Patent [19]

Suzuki et al.

[11] Patent Number: 5,566,017
[45] Date of Patent: Oct. 15, 1996

[54] MATERIAL FOR MAGNETO-OPTICAL ELEMENT AND FARADAY ROTATOR USING THE SAME

[75] Inventors: Toshiyasu Suzuki; Hirotaka Kawai, both of Hamamatsu; Hiromitsu Umezawa, Toyohashi, all of Japan

[73] Assignee: FDK Corporation, Tokyo, Japan

[21] Appl. No.: 510,616

[22] Filed: Aug. 3, 1995

[30] Foreign Application Priority Data

Aug. 4, 1994 [JP] Japan .................................. 6-202814
Aug. 30, 1994 [JP] Japan .................................. 6-228625

[51] Int. Cl.$^6$ .................................................. G02F 1/09
[52] U.S. Cl. ..................... 359/281; 359/280; 359/282; 359/324; 359/484; 372/702; 252/62.57
[58] Field of Search ........................... 359/280, 281, 359/282, 283, 256, 257, 322, 324, 484; 372/702; 252/62.57

[56] References Cited

U.S. PATENT DOCUMENTS

| | | | |
|---|---|---|---|
| 4,932,760 | 6/1990 | Arii et al. | 359/281 |
| 4,981,341 | 1/1991 | Brandle, Jr. et al. | 359/281 |
| 5,146,361 | 9/1992 | Licht | 359/280 |
| 5,463,316 | 10/1995 | Shirai et al. | 359/280 |
| 5,477,376 | 12/1995 | Iwatsuka et al. | 359/283 |
| 5,479,290 | 12/1995 | Tanno et al. | 359/324 |
| 5,512,193 | 4/1996 | Shirai et al. | 252/62.57 |

FOREIGN PATENT DOCUMENTS

| | | |
|---|---|---|
| 5-88126 | 4/1993 | Japan . |
| 5-88127 | 4/1993 | Japan . |

OTHER PUBLICATIONS

T. Tamaki et al., Magneto-Optical Properties of $(TbBi)_2Fe_5O_{12}$ and its application to a 1.5 μm wideband optical isolator, 70 (8), J. Appl. Phys., 4581 (1991).

R C Booth & E A White, Magneto-optic properties of rare earch iron garent crystals in the wavelength range 1.1–1.7 μm and their use in device fabrication, 17, J. Phys. D: Appl. Phys., 579,582 (1984).

T. Tamaki, Development of a Wideband Optical Isolator for Wavelength Multiplexing Transmission, No. 20 NHK Science & Technical Research Laboratories R & D, 8 (1992).

*Primary Examiner*—Loha Ben
*Attorney, Agent, or Firm*—Wenderoth, Lind & Ponack

[57] ABSTRACT

Disclosed is a material for a magneto-optical element, which is made of magnetic garnet single crystals being wide in a band width in a 1310 nm band and thereby being capable of coping with the wavelength multiplex communication at the wavelength band, and a Faraday rotator using the same. The material for a magneto-optical element is made of a magnetic garnet having a composition formula expressed by $R_{3-y-x}Sm_yBi_xFe_5O_{12}$, where R is one kind of rare earth elements including yttrium (Y), and "x" and "y" are constants defined by $0.3 \leq x \leq 1.9$ and $0.4 \leq y \leq 2.7$, the magnetic garnet being formed on a non-magnetic substrate by liquid-phase epitaxial growth. R is preferably one of Y, La, Sm and Lu. The Faraday rotator, which is used in a wavelength range of from 1250 to 1370 nm, is formed by superposing a film A made of LPE magnetic garnet single crystals expressed by a composition formula of $R1_{3-x}Bi_xFe_{5-z}Z_zO_{12}$, to a film B made of LPE magnetic garnet single crystals expressed by a composition formula of $R2_{3-y}Sm_yFe_5O_{12}$, where R1 is one of Al, In of rare earth elements including Y; Z is one of Al, In and Ga; R2 is one kind of rare earth elements including Bi and Y; and "x", "y" and "z" are constants defined by $0.3 \leq x \leq 1.9$, $0.5 \leq y \leq 3$ and $0 \leq z \leq 0.5$.

7 Claims, 5 Drawing Sheets

MATERIAL FOR MAGNETO-OPTICAL ELEMENT AND FARADAY ROTATOR USING THE SAME

BACKGROUND OF THE INVENTION

1. Field of the Invention

The present invention relates to a material made of magnetic garnet single crystals formed by liquid-phase epitaxial growth (hereinafter, referred to as "LPE") and to a Faraday rotator using the same, and particularly to a material for a magneto-optical element having a composition of $(RSmBi)_3Fe_5O_{12}$ and to a Faraday rotator formed by superposing two kinds of LPE magnetic garnet films different in the wavelength dependence on the Faraday rotation coefficient.

2. Description of the Related Art

A material made of magnetic garnet single crystals, which has a Faraday effect, is used as an essential material for an optical isolator. At present, the optical communication uses the 1310 nm band and 1550 nm band. In recent years, as a material made of magnetic garnet single crystals used in these wavelength bands, a single crystal film (LPE film) formed on a non-magnetic garnet single crystal substrate by the LPE process has been mainly used. The reason for this is that the LPE process is excellent in terms of mass-production.

Incidentally, the wavelength multiplex transmission remarked as a future optical communication of a large capacity essentially requires a wide band optical isolator having a wide wavelength band in which the change ratio of a Faraday rotation coefficient to the wavelength is made small. For a 1550 nm band, there has been known a wide band optical isolator using a Faraday rotator formed of a Bi substituted Tb iron garnet (Takahiko Tamaki, "Development of a wide band optical isolator for wavelength multiplexing transmission": NHK Science and Technical Research Laboratories R&D, No. 20, August, 1992, pages 8–17).

However, any wide band optical isolator having a sufficient performance for a 1310 nm band has never been developed. For example, an LPE film having a composition of $Tb_{1.85}Bi_{1.15}Fe_{4.75}Al_{0.25}O_{12}$ used for such a wavelength band is narrow in the wavelength band width, and it cannot be applicable for the wavelength multiplex communication. In view of the foregoing, even for a 1310 nm band, an optical isolator having a wide band comparable to that used for a 1550 nm band has been required to be developed.

SUMMARY OF THE INVENTION

An object of the present invention is to provide a material for a magneto-optical element, which is made of magnetic garnet single crystals being wide in a band width in a wavelength range of from 1250 to 1370 nm and thereby being capable of coping with the wavelength multiplex communication at the wavelength band, and a Faraday rotator using the same.

To achieve the above and other objects, according to one aspect of the present invention, there is provided a material for a magneto-optical element used in a wavelength range of from 1250 to 1370 nm, which is made of a magnetic garnet having a composition formula expressed by $R_{3-y-x}Sm_yBi_xFe_5O_{12}$, where R is one kind of rare earth elements including yttrium (Y), and "x" and "y" are constants defined by $0.3 \leq x \leq 1.9$ and $0.4 \leq y \leq 2.7$, respectively, said magnetic garnet being formed on a non-magnetic substrate by liquid-phase epitaxial growth.

In the above-described material, for example, R may be one kind of rare earth elements selected from a group consisting of Y, La, Sm and Lu. Preferably, the material is made of a magnetic garnet having a composition of $La_{0.08}Sm_{2.15}Bi_{0.77}Fe_5O_{12}$, said magnetic garnet being formed on a non-magnetic garnet substrate of $Cd_3Sc_2Ga_3O_{12}$.

The present inventors have found that a Bi substituted Sm iron garnet is widened in the wavelength band width as compared with the prior art Bi substituted Tb iron garnet. On the basis of this knowledge, the present invention has been accomplished. Incidentally, as for a wide band optical-isolator used in a 1310 nm band, the 1310 nm band applicable for optical communication is not certainly determined. Here, for convenience, the wavelength band was defined as follows, and experiments were evaluated on the basis of the defined standard of the wavelength band. An optical isolator used for an excitation light source has a very high performance, and in most cases, it requires a quenching ratio of 35 dB or more. In this regard, an evaluation standard was determined as follows:

"When a quenching ratio at the center wavelength is 45 dB, the wavelength band in which the quenching ratio is 35 dB or more is calculated, and the width of the wavelength is taken as a wavelength band width. In this case, the center wavelength is determined such that the wavelength band width is most widened."

The wavelength band width was calculated on the basis of the measured Faraday rotation coefficient. Letting $K_o$ be a quenching ratio at the center wavelength, and K be a quenching ratio at a certain wavelength, the following equation is obtained:

$$K = -10 \times \log(10^{-K_o/10} + \sin^2 \Delta\Theta_F)$$

where $\Delta\Theta_F$ is a difference in a Faraday rotation angle between wavelengths having quenching ratios $K_O$ and K. When $K_o=45$ and $K=35$ are substituted in the above equation, $\Delta\Theta_F$ becomes 0.97. This value means the angular difference from the Faraday rotation angle at the center wavelength in the 1310 nm band.

The wavelength band width thus defined is 22 nm for the prior art Bi substituted Tb iron garnet single crystals, and is 35 nm or more for the material of the present invention. The wavelength band width of 35 nm is considered as the minimum value required for the wavelength multiplex communication expected to be practically used in future. In the material of the present invention, as described above, the constant "x" indicating the Bi amount is specified to be 0.3 (/f.u.) or more. The reason for this is as follows: namely, an LPE film is grown only in a thickness of about 500 μm, and thereby a Faraday rotator is required to be formed by superposing two pieces of the LPE films to each other; and in this regard, the Faraday rotation coefficient of one LPE film requires a value of 500 (deg/cm) or more as the absolute value. The Faraday rotation coefficient is proportional to the Bi amount, and the absolute value of the Faraday rotation coefficient becomes 500 (deg/cm) or more when the Bi amount is 0.3 (/f.u.) or more. The constant "x" indicating the Bi amount is also specified to be 1.9 (/f.u.) or less. When it is more than 1.9 (/f.u.), the LPE film cannot be formed because of the generation of cracks. In the LPE film containing a large amount of Bi, the thermal expansion coefficient is increased, to enlarge a difference in thermal expansion between the LPE film and the substrate, thus generating a large stress therebetween during temperature drop after growth of the LPE film.

In the Bi substituted Sm iron garnet single crystals, peaks of Faraday rotation appear near 1240 nm and 1380 nm due to the optical absorption by Sm; however, the change ratio of the Faraday rotation coefficient to the wavelength near 1310 nm is made small, thus widening the width of the 1310 nm band.

According to another aspect of the present invention, there is provided a Faraday rotator used in a wavelength range of from 1250 to 1370 nm, which is formed by superposing a film A and a film B to each other, said film A being made of liquid-phase epitaxial magnetic garnet single crystals having a composition formula expressed by $R1_{3-x}Bi_xFe_{5-z}Z_zO_{12}$, where R1 is one kind of rare earth elements including Y; Z is an element selected from a group consisting of Al, In and Ga; and "x" and "z" are constants defined by $0.3 \leq x \leq 1.9$ and $0 \leq z \leq 0.5$, and said film B being made of liquid-phase epitaxial magnetic garnet single crystals expressed by a composition formula of $R2_{3-y}Sm_yFe_5O_{12}$, where R2 is one kind of rare earth elements including Bi and Y; and "y" is a constant defined by $0.5 \leq y \leq 3$.

Here, preferably, the constant "x" indicating the Bi amount in said film A is in the range of $0.7 \leq x \leq 1.9$, and the constant "y" indicating the Sm amount in said film B is in the range of $0.5 < y \leq 3$. Moreover, preferably, R1 in said film A is one kind of rare earth elements including Y but not including Sm, and R2 in said film B is one kind of rare earth elements including Y.

The present inventors have manufactured trial LPE magnetic garnets having various compositions, and measured various characteristics thereof, and found that a sample containing Sm is different from a sample not containing Sm in terms of the change ratio of the Faraday rotation coefficient to the wavelength (FWC) at the wavelength of 1310 nm. One example of the experimental results is shown in Table 1.

TABLE 1

| Sample No. | Composition | FWC (%/nm) |
| --- | --- | --- |
| 1 | $Tb_{1.85}Bi_{1.15}Fe_{4.75}Al_{0.25}O_{12}$ | −0.18 |
| 2 | $Tb_{1.70}Y_{0.41}La_{0.14}Bi_{0.75}Fe_5O_{12}$ | −0.19 |
| 3 | $Tb_{1.87}Y_{0.28}La_{0.19}Bi_{0.66}Fe_5O_{12}$ | −0.18 |
| 4 | $Tb_{1.30}Gd_{0.64}La_{0.22}Bi_{0.84}Fe_5O_{12}$ | −0.20 |
| 5 | $Tb_{2.06}La_{0.13}Bi_{0.81}Fe_{4.98}Al_{0.02}O_{12}$ | −0.18 |
| 6 | $Y_{1.63}Bi_{1.37}Fe_5O_{12}$ | −0.20 |
| 7 | $Lu_{0.58}Sm_{2.12}Bi_{0.30}Fe_5O_{12}$ | 0.12 |
| 8 | $Tb_{1.86}Ho_{0.22}La_{0.22}Bi_{0.70}Fe_5O_{12}$ | −0.18 |
| 9 | $Gd_{1.34}L_{0.04}Bi_{1.62}Fe_5O_{12}$ | −0.19 |
| 10 | $Gd_{1.25}La_{0.05}Bi_{1.70}Fe_5O_{12}$ | −0.18 |
| 11 | $Gd_{1.24}La_{0.05}Bi_{1.71}Fe_5O_{12}$ | −0.19 |
| 12 | $Tb_{1.06}Lu_{0.53}Bi_{1.41}Fe_5O_{12}$ | −0.17 |
| 13 | $Tb_{1.09}Lu_{0.55}Bi_{1.36}Fe_5O_{12}$ | −0.19 |

Here, the change ratio of the Faraday rotation coefficient to the wavelength (FWC) at the wavelength of 310 nm is defined as the following equation:

$$FWC = \{\Theta_F(1310\ nm) - \Theta_F(1330\ nm)\} / |\Theta_F(1310\ nm)|/20 \times 100\ (\%/nm)$$

$\Theta_F(1310\ nm)$ and $\Theta_F(1330\ nm)$ indicate Faraday rotation coefficients at 1310 nm and 1330 nm, respectively.

Figure 3:
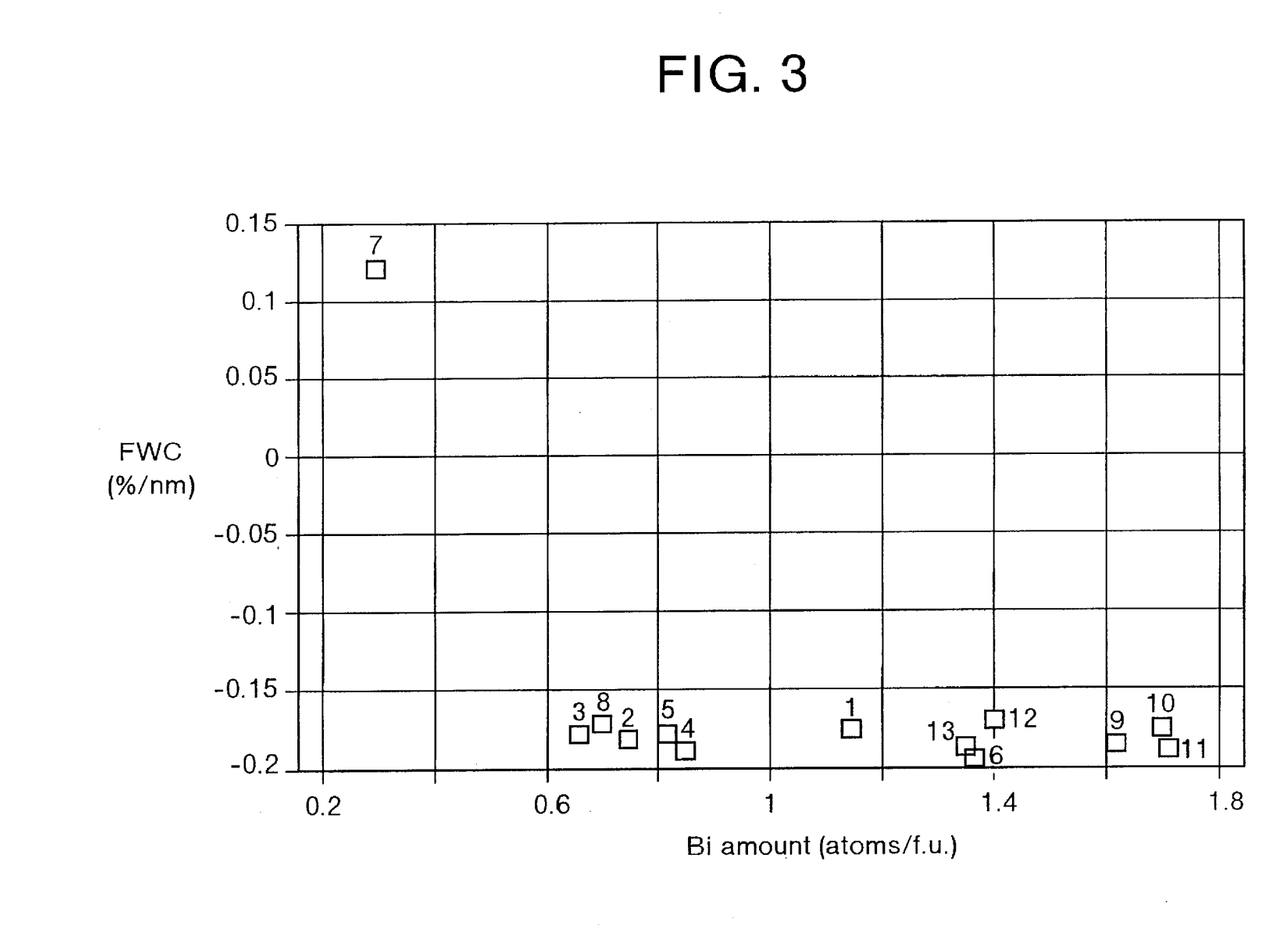
FIG. 3 is a graph showing the relationship between the Bi constant and FWC.

As is apparent from Table 1, only the FWC of the sample 7 containing Sm exhibits a value of +0.12%/nm, and the FWCs of other samples are in the range of from −0.17 to −0.20%/nm. FIG. 3 shows the relationship between the FWC and the Bi amount with respect to each sample. As is apparent from this graph, in the case of samples not containing Sm, the FWCs are nearly made constant irrespective of the kinds of rare earth elements and the Bi amounts. And, the sample made of rare earth iron garnet single crystals containing Sm has a FWC of an opposite sign to that of the samples made of Bi substituted rare earth iron garnet single crystals not containing Sm in terms of the wavelength dependence on the Faraday rotation coefficient at the wavelength of 1310 nm. Accordingly, by combination of both the materials, it becomes possible to widen the wavelength band as compared with the case of an independent single crystal film.

In another aspect of the present invention, as described above, the Faraday rotator is formed by superposing the films A and B to each other. In this case, actually, the films A and B are separately formed by the LPE process, and then superposed to each other. This is advantageous in that the substrate material and the film composition can be selectively used. However, there may be adopted a construction in which either of the films A and B is formed on a non-magnetic garnet substrate by the LPE process, and the other film is formed thereon by the LPE process; or a construction in which the film A is formed on one surface of a non-magnetic garnet substrate by the LPE process and the film B is formed on the other surface of the substrate by the LPE process.

The A film may not necessarily contain Al, In and Ga; however, when part of Fe-site is substituted for non-magnetic Al, In or Ga, the saturated magnetization of the LPE film is made small, thus making it possible to reduce the size of a magnet constituting an optical isolator. However, when the substituted amount is excessively large, the Faraday rotation coefficient is disadvantageously reduced. Consequently, the constant "z" is specified to be in the range of $z \leq 0.5$. The reason why the constant "y" indicating the Sm content is specified in the range of $0.5 \leq y \leq 3$ is that the excellent effect cannot be obtained when the Sm content is out of the range.

Figure 4:
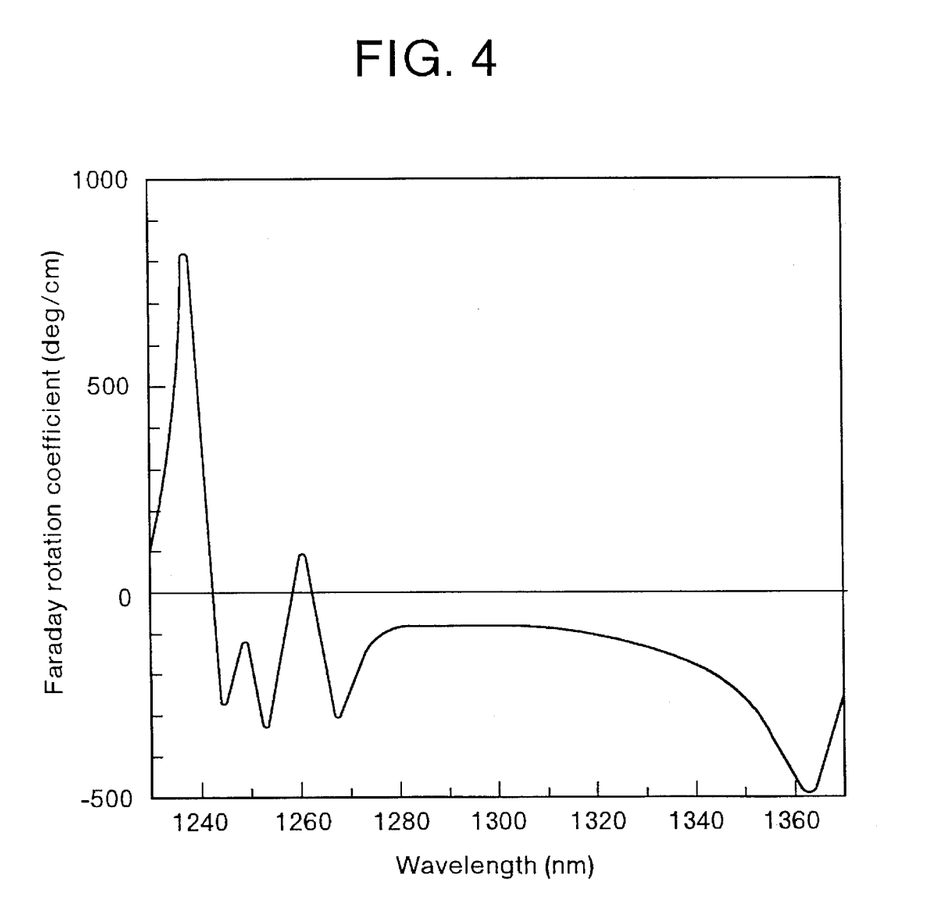
FIG. 4 is a graph showing the wavelength dependence on the Faraday rotation coefficient of Sm iron garnet single crystals.
Figure 5:
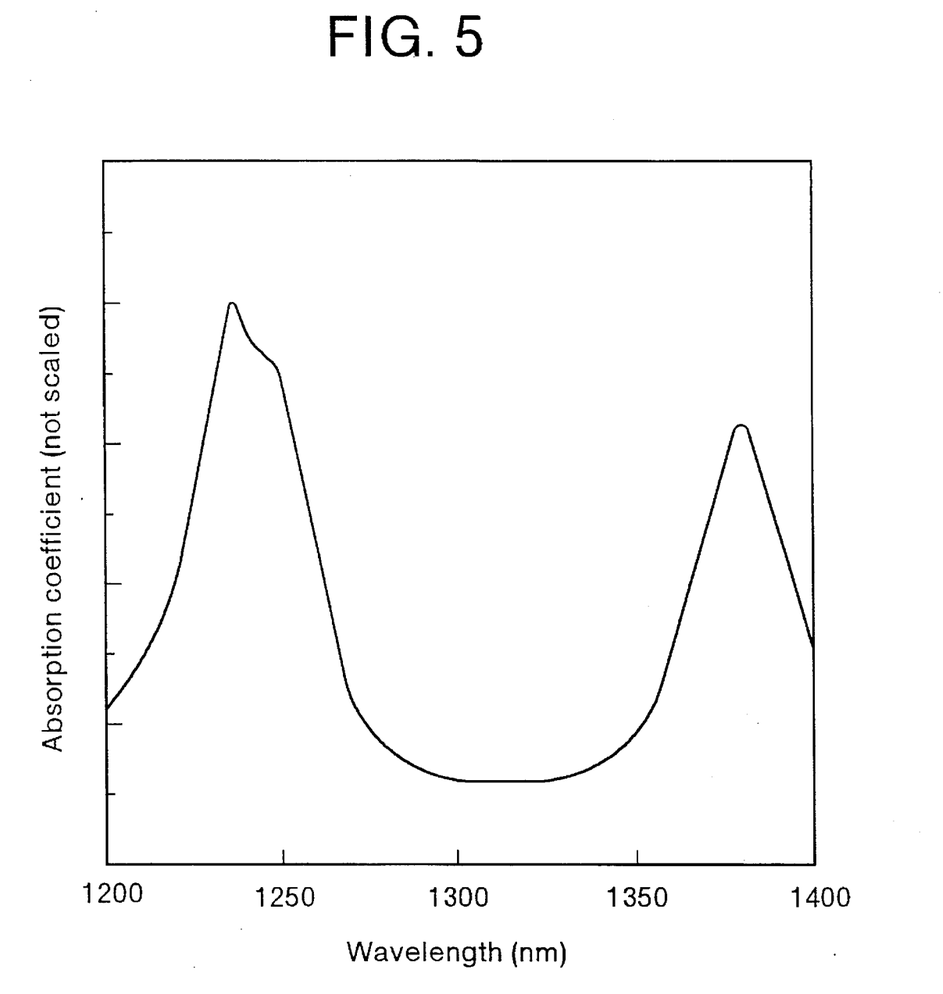
FIG. 5 is graph showing a optical absorption spectrum of Sm iron garnet single crystals.

As shown in FIG. 5, in the Sm iron garnet single crystals, the absorption by Sm appears near 1240 nm and 1380 nm. By the effect of this absorption, as shown in FIG. 4, a peak of the Faraday rotation coefficient is generated, and the change ratio of the Faraday rotation coefficient to the wavelength (FWC) has a positive value. This phenomenon is peculiar to rare earth iron garnets containing Sm.

In the Bi-substituted type rare earth iron garnet single crystals, the Faraday rotation coefficient is increased when the Bi content is made larger, and thereby the film thickness necessary for obtaining the Faraday rotation angle of 45° can be made smaller. In the Bi substituted type rare earth iron garnet single crystals not containing Sm (or containing Sm in a slight amount), as described above, the change ratio of the Faraday rotation coefficient to the wavelength (FWC) near 1310 nm has a negative value being nearly constant irrespective of the kind of the rare earth element and the Bi amount. Accordingly, by combination of the films having both the properties, the FWCs near 1310 nm are canceled, to thus widen the wavelength band width. In the present invention, the A film containing a large amount of Bi is effective to obtain a large Faraday rotation angle, and the B film containing Sm is effective to adjust the FWC.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF PREFERRED EMBODIMENTS AND BEST MODE FOR CARRYING OUT THE INVENTION

A material for a magneto-optical element made of magnetic garnet single crystals according to the present invention will be described with reference to experimental examples.

Experimental Example 1

A material of single crystals having a composition of $Y_{1.45}Sm_{0.44}Bi_{1.11}Fe_5O_{12}$ was grown on a substrate of a $(CaGd)_3(MgZrGa)_5O_{12}$ (lattice constant: 12.496 Å) by the LPE process. $Bi_2O_3$-$B_2O_3$-PbO was used as a flux. In the material made of single crystals thus obtained, the Faraday rotation coefficient at a wavelength of 1310 nm was −1838 (deg/cm); the wavelength in which the quenching ratio was 35 dB or more was in the range of from 1324 to 1362 nm; and the wavelength band width was 38 nm.

Experimental Example 2

A material made of single crystals having a composition of $La_{0.08}Sm_{2.15}Bi_{0.77}Fe_5O_{12}$ was grown on a substrate of $Gd_3Sc_2Ga_4O_{12}$ (lattice constant: 12.561 Å) by the LPE process. $Bi_2O_3$-$B_2O_3$-PbO was used as a flux. In the material made of single crystals thus obtained, the Faraday rotation coefficient at a wavelength of 1310 nm was −1535 (deg/cm); the wavelength in which the quenching ratio was 35 dB or more was in the range of from 1290 to 1350 nm; and the wavelength band width was 60 nm.

Experimental Example 3

A material made of single crystals having a composition of $Lu_{0.58}Sm_{2.12}Bi_{0.30}Fe_5O_{12}$ was grown on a substrate of $(CaGd)_3(MgZrGa)_5O_{12}$ (lattice constant: 12,496 Å) by the LPE process. $Bi_2O_3$-$B_2O_3$-PbO was used as a flux. In the material made of single crystals thus obtained, the Faraday rotation coefficient at a wavelength of 1310 nm was −560 (deg/cm); the wavelength in which the quenching ratio was 35 dB or more was in the range of from 1282 to 1334 nm; and the wavelength band width was 52 nm.

Experimental Example 4

A material made of single crystals having a composition of $Lu_{1.94}Sm_{0.56}Bi_{0.50}Fe_5O_{12}$ was grown on a substrate of $Gd_3Ga_5O_{12}$ (lattice constant: 12.383 Å) by the LPE process. $Bi_2O_3$-$B_2O_3$-PbO was used as a flux. In the material made of single crystals thus obtained, the Faraday rotation coefficient at a wavelength of 1310 nm was −752 (deg/cm); the wavelength in which the quenching ratio was 35 dB or more was in the range of from 1310 to 1360 nm; and the wavelength band width was 50 nm.

Experimental Example 5

A material made of single crystals having a composition of $Sm_{2.50}Bi_{0.50}Fe_5O_{12}$ was grown on a substrate of $Gd_3(ScGa)_2Ga_3O_{12}$ (lattice constant: 12.536 Å) by the LPE process. $Bi_2O_3$-$B_2O_3$-PbO was used as a flux. In the material made of single crystals thus obtained, the Faraday rotation coefficient at a wavelength of 1310 nm was −1000 (deg/cm); the wavelength in which the quenching ratio was 35 dB or more was in the range of from 1284 to 1342 nm; and the wavelength band width was 58 nm.

Experimental Example 6

A material made of single crystals having a composition of $Lu_{0.24}Sm_{0.86}Bi_{1.90}Fe_5O_{12}$ grown on a substrate of $Gd_3Sc_2Ga_3O_{12}$ (lattice constant 12.561 Å) by the LPE process. $Bi_2O_3$-$B_2O_3$-PbO was used as a flux. In the material made of single crystals thus obtained, the Faraday rotation coefficient at a wavelength of 1310 nm was −3323 (deg/cm); the wavelength in which the quenching ratio was 35 dB or more was in the range of from 1322 to 1362 nm; and the wavelength band width was 40 nm.

Experimental Example 7

A material made of single crystals having a composition of $Lu_{0.32}Sm_{0.58}Bi_{2.10}Fe_5O_{12}$ was intended to be grown on a substrate of $GD_3Sc_2Ga_3O_{12}$ (lattice constant: 12.561 Å) by the LPE process; but was not grown because of a large amount of Bi amount.

Experimental Example 8

A material made of single crystals having a composition of $Lu_{0.71}Sm_{1.29}Bi_{1.00}Fe_5O_{12}$ was grown on a substrate of $(CaGd)_3(MgZrGa)_5O_{12}$ (lattice constant: 12,496 Å) by the LPE process. $Bi_2O_3$-$B_2O_3$-PbO was used as a flux. In the material made of single crystals thus obtained, the Faraday rotation coefficient at a wavelength of 1310 nm was −1745 (deg/cm); the wavelength in which the quenching ratio was 35 dB or more was in the range of from 1306 to 1358 nm; and the wavelength band width was 52 nm.

Comparative Example

A material made of single crystals having a composition of $Tb_{1.85}Bi_{1.15}Fe_{4.75}Al_{0.25}O_{12}$ was grown on a substrate of $(CaGd)_3(MgZrGa)_5O_{12}$ (lattice constant: 12,496 Å) by the LPE process. $Bi_2O_3$-$B_2O_3$-PbO was used as a flux. In the material made of single crystals thus obtained, the Faraday rotation coefficient at a wavelength of 1310 nm was −1570 (deg/cm); the wavelength in which the quenching ratio was 35 dB or more was in the range of from 1300 to 1322 nm; and the wavelength band width was 22 nm.

Figure 1:
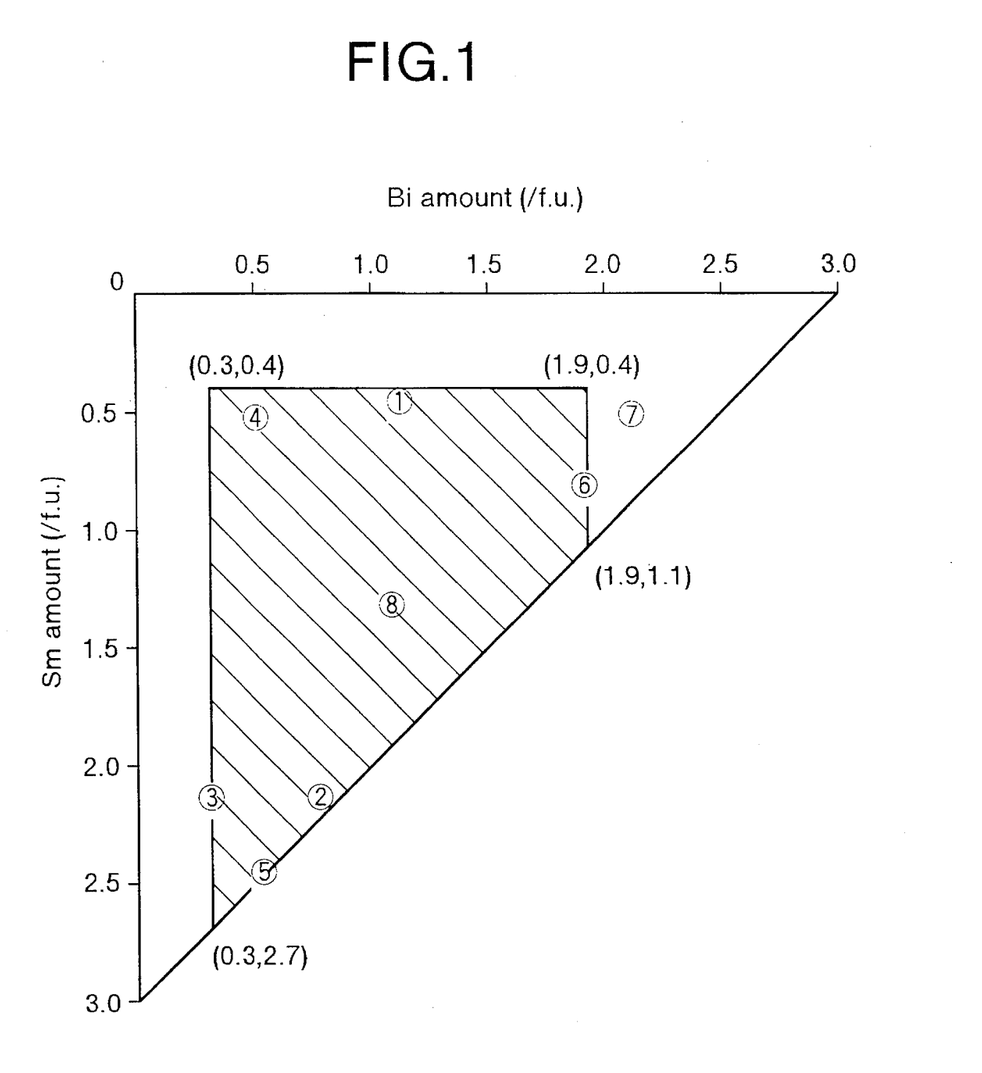
FIG. 1 is a view illustrating a composition region of the present invention.

FIG. 1 shows the composition region in Experimental Examples 1 to 8 which are plotted in the relationship between the amounts of Bi and Sm. The surrounded hatched region is within the scope of the present invention. In this region, a wavelength band width of 35 nm or more in a wavelength range of from 1282 to 1362 can be obtained.

Figure 2:
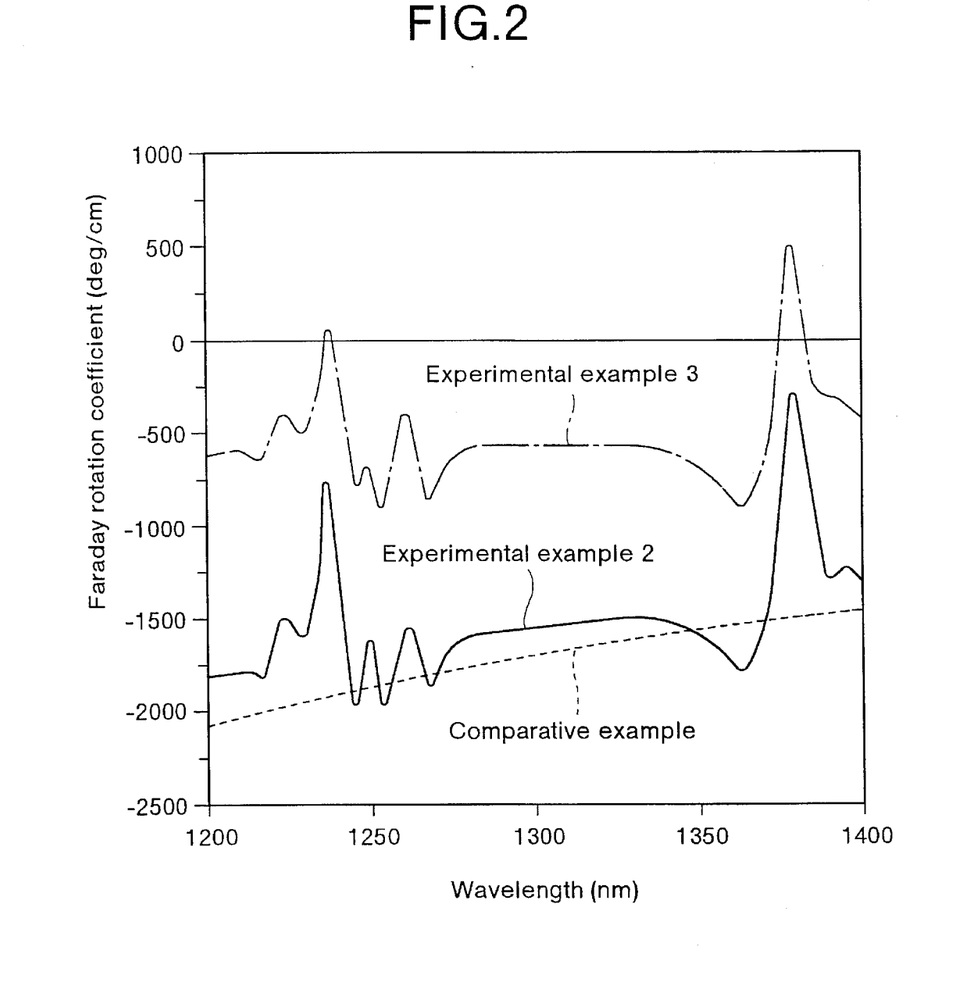
FIG. 2 is a graph showing a wavelength dependence on a Faraday rotation coefficient with respect to typical examples of the present invention and a comparative example, i.e., related art.

FIG. 2 shows the wavelength dependence on the Faraday rotation coefficient, with respect to Experimental Examples 2 and 3 as the typical examples of the present invention and Comparative Example (related art of Bi substituted Tb iron garnet). In the Comparative Example, as the wavelength is increased, a Faraday rotation coefficient is linearly increased, and consequently, the wavelength dependence near 1310 nm is very large. On the contrary, in the material of the present invention, peaks due to absorption are observed near 1240 nm and 1380 nm, and thereby the wavelength dependence on the Faraday rotation coefficient is made smaller near 1310 nm (between 1240 nm and 1380 nm), as a result of which the wavelength band width near 1310 nm is widened.

The Faraday rotator according to another aspect of the present invention will be described below. In this embodiment, a Bi substituted type rare earth iron garnet single crystal film (A film) was grown on a non-magnetic garnet substrate by the LPE process. $Bi_2O_3$-$B_2O_3$-$PbO$ was used as a flux. The composition and magento-optical characteristics of each film A (five kinds of A-1 to A-5) thus grown and each substrate used are shown in Table 2.

As is apparent from Table 2, as the Bi content is increased, the Faraday rotation coefficient is made larger. However, when the constant "x" indicating the Bi content is excessively large (x>1.9), cracks are generated on the film because of a difference in thermal expansion between the substrate and the film, thus failing to grow single crystals. In these films, the wavelength band width is in the range of 22 nm or less. In the composition of the film A-1, since the Bi content is small, the Faraday rotation coefficient is small, and accordingly, it is necessary to increase the film thickness or to be used in the form of a double film structure. As a result, the constant "x" indicating the content of Bi is preferably in the range of 0.7 or more.

Similarly, a rare earth iron garnet single crystal film (film B) containing Sm was grown on a non-magnetic garnet substrate by the LPE process. $Bi_2O_3$-$B_2O_3$-$PbO$ was used as a flux. The composition and magento-optical characteristics of each film B (seven kinds of B-1 to B-7) thus grown and substrates used are shown in Table 3.

width were obtained. The results are shown in Table 4.

TABLE 4

| No. | Film A | | Film B | | Wavelength band (nm) | |
|---|---|---|---|---|---|---|
| | Film No. | Film thickness (μm) | Film No. | Film thickness (μm) | Wavelength range | Band width |
| 1 | A-2 | 450 | B-1 | 363 | 1299~1321 | 22 |
| 2 | A-3 | 265 | B-1 | 440 | 1300~1322 | 22 |
| 3 | A-4 | 219 | B-1 | 450 | 1300~1322 | 22 |
| 4* | A-2 | 450 | B-2 | 300 | 1298~1327 | 29 |
| 5* | A-3 | 270 | B-2 | 413 | 1296~1325 | 29 |
| 6* | A-4 | 221 | B-2 | 400 | 1297~1325 | 28 |
| 7** | A-2 | 450 | B-3 | 382 | 1307~1361 | 54 |
| 8** | A-3 | 210 | B-4 | 450 | 1288~1350 | 62 |
| 9** | A-4 | 170 | B-5 | 372 | 1284~1347 | 63 |
| 10* | A-1 | 428 × 2 | B-6 | 450 | 1283~1342 | 59 |
| 11** | A-2 | 230 | B-6 | 370 | 1283~1344 | 61 |
| 12** | A-3 | 130 | B-6 | 375 | 1283~1344 | 61 |
| 13** | A-4 | 110 | B-6 | 360 | 1283~1345 | 62 |
| 14** | A-2 | 330 | B-7 | 420 | 1282~1340 | 58 |
| 15** | A-3 | 190 | B-7 | 405 | 1283~1341 | 58 |
| 16** | A-4 | 160 | B-7 | 350 | 1283~1344 | 61 |

The film A used in Experimental Example 10 is of a double film structure. In Table 4, Experimental Examples added with the mark (*) are within the scope of the present invention, and those added with the mark (**) are preferable examples. In the present invention, by combination of the films A and B, the wavelength band width can be widened as compared with the case singly using each of the films A

TABLE 2

| Film No. | x | Composition of film | $\theta_F$ (deg/cm) | Wavelength band width (nm) | FWC (%/nm) | Composition of substrate | Lattice constant (Å) |
|---|---|---|---|---|---|---|---|
| A-1 | 0.3 | $Y_{2.7}Bi_{0.3}Fe_{4.5}Ga_{0.5}O_{12}$ | −266 | 16 | −0.24 | $Gd_3Ga_5O_{12}$ | 12.385 |
| A-2 | 0.7 | $Gd_{2.3}Bi_{0.7}Fe_5O_{12}$ | −1042 | 22 | −0.21 | $(CaGd)_3(MgZrGa)_5O_{12}$ | 12.501 |
| A-3 | 1.4 | $Tb_{1.6}Bi_{1.4}Fe_{4.7}Al_{0.3}O_{12}$ | −2170 | 22 | −0.20 | $(CaGd)_3(MgZrGa)_5O_{12}$ | 12.496 |
| A-4 | 1.9 | $Gd_{1.1}Bi_{1.9}Fe_{4.5}In_{0.5}O_{12}$ | −2892 | 22 | −0.20 | $(GdNd)_3Sc_2Ga_3O_{12}$ | 12.617 |
| A-5 | 2.1 | $Tb_{0.9}Bi_{2.1}Fe_5O_{12}$ | Not grown because of cracking | | | $Gd_3Sc_2Ga_3O_{12}$ | 12.561 |

TABLE 3

| Film No. | y | Composition of film | $\theta_F$ (deg/cm) | Wavelength band width (nm) | FWC (%/nm) | Composition of substrate | Lattice constant (Å) |
|---|---|---|---|---|---|---|---|
| B-1 | 0.2 | $Y_{2.8}Sm_{0.2}Fe_5O_{12}$ | 198 | 38 | 0.20 | $Gd_3Ga_5O_{12}$ | 12.385 |
| B-2 | 0.5 | $Tb_{2.5}Sm_{0.5}Fe_5O_{12}$ | 237 | 26 | 0.37 | $(CaGd)_3(MgZrGa)_5O_{12}$ | 12.447 |
| B-3 | 0.8 | $Tb_{2.2}Sm_{0.8}Fe_5O_{12}$ | 173 | 6 | 0.65 | $(CaGd)_3(MgZrGa)_5O_{12}$ | 12.456 |
| B-4 | 1.6 | $Gd_{1.4}Sm_{1.6}Fe_5O_{12}$ | −55 | 0 | 6.67 | $(CaGd)_3(MgZrGa)_5O_{12}$ | 12.496 |
| B-5 | 2.4 | $Y_{0.6}Sm_{2.4}Fe_5O_{12}$ | −83 | 8 | 2.20 | $(CaGd)_3(MgZrGa)_5O_{12}$ | 12.496 |
| B-6 | 2.8 | $Bi_{0.2}Sm_{2.8}Fe_5O_{12}$ | −496 | 40 | 0.28 | $Nd_3Ga_5O_{12}$ | 12.527 |
| B-7 | 3.0 | $Sm_3Fe_5O_{12}$ | −159 | 10 | 1.38 | $Nd_3Ga_5O_{12}$ | 12.521 |

As is apparent from Table 3, the Sm iron garnet film not containing Bi is very small in the Faraday rotation coefficient and is impossible to singly constitute a 45° Faraday rotator. In particular, the wavelength band width is very small when the constant "y" indicating the Sm amount is in the range of $0.5 < y \leq 3$.

For this reason, a 45° Faraday rotator was prepared by combination of the films A and B thus grown. With respect of such a Faraday rotator, the wavelength range in which the quenching ratio was 35 dB or more and the wavelength band and B. In particular, each of Experimental Examples added with the mark (**) exhibits a wavelength band of from 54 to 63 nm, that is, it can widen the wavelength band width by about 2.5 to 2.9 times that of each case singly using the film A.

For comparison, a typical example of a 45° Faraday rotator used in the 1310 nm band at present will be described. The film composition is $Tb_{1.85}Bi_{1.15}Fe_{4.75}Al_{0.25}O_{12}$, and the substrate is made of a material of $(CaGd)_3(MgZrGa)_5O_{12}$ (lattice constant: 12,496

Å). In this single crystal film, the Faraday rotation coefficient at a wavelength of 1310 nm is −1570 (deg/cm); the wavelength in which the quenching ratio is 35 dB or more is in the range of from 1300 to 1322 nm; and the wavelength band width is 22 nm.

While the present invention has been discussed in terms of the preferred embodiments, the present invention should be implemented in various fashions with incorporating modifications of the disclosed embodiments in addition, omission or modification of the detailed construction, without departing from the principle of the invention. Therefore, the present invention should be understood to include all embodiments encompassed within the spirit of the invention set out in the appended claims.

What is claimed is:

1. A material for a magneto-optical element used in a wavelength range of from 1250 to 137 nm, which is made of a magnetic garnet having a composition formula expressed by $R_{3-y-x}Sm_yBi_xFe_5O_{12}$, where R is one kind of rare earth elements including yttrium (Y), and "x" and "y" are constants defined by $0.3 \leq x \leq 1.9$ and $0.4 \leq y \leq 2.7$, said magnetic garnet being formed on a non-magnetic substrate by liquid-phase epitaxial growth.

2. A material for a magneto-optical element as set forth in claim 1, wherein R is one kind of rare earth elements selected from a group consisting of Y, La, Sm and Lu.

3. A material for a magneto-optical element used in a wavelength range of from 1250 to 1370 nm, which is made of a magnetic garnet having a composition of $La_{0.08}Sm_{2.15}Bi_{0.77}Fe_5O_{12}$, said magnetic garnet being formed on a non-magnetic garnet substrate of $Gd_3Sc_2Ga_3O_{12}$.

4. A Faraday rotator used in a wavelength range of from 1250 to 1370 nm, which is formed by superposing a film A and a film B to each other, said film A being made of liquid-phase epitaxial magnetic garnet single crystals having a composition formula expressed by $R1_{3-x}Bi_xFe_{5-z}Z_zO_{12}$, where R1 is one kind of rare earth elements including Y; Z is an element selected from a group consisting of Al, In and Ga; and "x" and "z" are constants defined by $0.3 \leq x \leq 1.9$ and $0 \leq z \leq 0.5$, and said film B being made of liquid-phase epitaxial magnetic garnet single crystals expressed by a composition formula of $R2_{3-y}Sm_yFe_5O_{12}$, where R2 is one kind of rare earth elements including Bi and Y; and "y" is a constant defined by $0.5 \leq y \leq 3$.

5. A Faraday rotator according to claim 4, wherein R1 in said film A is one kind of rare earth elements including Y but not including Sm, and R2 in said film B is one kind of rare earth elements including Y.

6. A Faraday rotator as set forth in claim 4, wherein the constant "x" indicating the Bi amount in said film A is in the range of $0.7 \leq x \leq 1.9$, and the constant "y" indicating the Sm amount in said film B is in the range of $0.5 < y \leq 3$.

7. A Faraday rotator according to claim 6, wherein R1 in said film A is one kind of rare earth elements including Y but not including Sm, and R2 in said film B is one kind of rare earth elements including Y.

* * * * *